US007974892B2

(12) United States Patent
Fredericks et al.

(10) Patent No.: US 7,974,892 B2
(45) Date of Patent: Jul. 5, 2011

(54) SYSTEM AND METHOD FOR EXPENSE MANAGEMENT

(75) Inventors: Michael Fredericks, Fairfax, VA (US); Joseph Dunnick, Baltimore, MD (US); Valery Gorodnichev, Vernon, IL (US); Jeannine Armstrong, Sea Cliff, NY (US)

(73) Assignee: Concur Technologies, Inc., Redmond, WA (US)

( * ) Notice: Subject to any disclaimer, the term of this patent is extended or adjusted under 35 U.S.C. 154(b) by 498 days.

(21) Appl. No.: 11/159,398

(22) Filed: Jun. 23, 2005

(65) Prior Publication Data
US 2005/0289025 A1 Dec. 29, 2005

Related U.S. Application Data

(60) Provisional application No. 60/581,766, filed on Jun. 23, 2004.

(51) Int. Cl.
*G07B 17/00* (2006.01)
*G06F 11/34* (2006.01)

(52) U.S. Cl. .............. 705/30; 705/35; 705/40

(58) Field of Classification Search .......... 705/5, 6, 705/11, 30, 35, 40
See application file for complete search history.

(56) References Cited

U.S. PATENT DOCUMENTS

| | | | |
|---|---|---|---|
| 5,191,523 A | 3/1993 | Whitesage | |
| 5,570,283 A | 10/1996 | Shoolery et al. | |
| 5,648,900 A * | 7/1997 | Bowen et al. | 705/5 |
| 5,739,512 A | 4/1998 | Tognazzini | |
| 5,832,451 A | 11/1998 | Flake et al. | |
| 5,832,454 A | 11/1998 | Jafri et al. | |
| 5,899,981 A * | 5/1999 | Taylor et al. | 705/30 |
| 5,948,040 A | 9/1999 | DeLorme et al. | |
| 6,009,408 A * | 12/1999 | Buchanan | 705/11 |
| 6,023,679 A * | 2/2000 | Acebo et al. | 705/5 |
| 6,029,144 A | 2/2000 | Barrett et al. | |
| 6,115,680 A | 9/2000 | Coffee et al. | |
| 6,307,572 B1 | 10/2001 | DeMarcken et al. | |
| 6,442,256 B1 | 8/2002 | Garland et al. | |
| 6,442,526 B1 * | 8/2002 | Vance et al. | 705/5 |
| 6,446,048 B1 * | 9/2002 | Wells et al. | 705/35 |
| 7,050,986 B1 | 5/2006 | Vance et al. | |
| 7,103,558 B1 | 9/2006 | Patton et al. | |
| 7,249,041 B2 | 7/2007 | Last | |
| 7,343,295 B2 | 3/2008 | Pomerance | |
| 7,395,231 B2 * | 7/2008 | Steury et al. | 705/34 |
| 7,409,643 B2 | 8/2008 | Daughtrey | |
| 7,483,883 B2 | 1/2009 | Barth et al. | |
| 7,493,261 B2 | 2/2009 | Chen et al. | |
| 7,502,746 B2 | 3/2009 | Bertram et al. | |
| 7,516,089 B1 | 4/2009 | Walker et al. | |
| 7,539,620 B2 | 5/2009 | Winterton et al. | |

(Continued)

OTHER PUBLICATIONS

PR Newswire, Concur Technologies Launches Concur Expense 7.0, Jul. 24, 2003. p. 1.*
Office Action issued on Jul. 12, 2007, in U.S. Appl. No. 10/373,096.
Office Action issued in U.S. Appl. No. 10/373,096, mailed Feb. 11, 2008.
Office Action issued in U.S. Appl. No. 10/373,096, mailed May 22, 2009.
Office Action issued in U.S. Appl. No. 10/373,096, mailed Nov. 13, 2008.
Office Action issued in U.S. Appl. No. 11/763,562, mailed Oct. 5, 2009.

(Continued)

*Primary Examiner* — F. Ryan Zeender
*Assistant Examiner* — Dana Amsdell
(74) *Attorney, Agent, or Firm* — DLA Piper LLP US

(57) ABSTRACT

A method for expense management. An expense data record is retrieved from a trusted source and two or more sub-transactions are identified. The expense data record is then added to an expense report as two or more expense items corresponding to the two or more sub-transactions.

46 Claims, 6 Drawing Sheets

U.S. PATENT DOCUMENTS

| | | | |
|---|---|---|---|
| 7,548,615 | B2 | 6/2009 | Bhalgat et al. |
| 2002/0042715 | A1* | 4/2002 | Kelley ............................... 705/1 |
| 2002/0077871 | A1 | 6/2002 | Udelhoven et al. |
| 2002/0100803 | A1 | 8/2002 | Sehr |
| 2002/0095256 | A1 | 9/2002 | Masaki et al. |
| 2002/0152100 | A1 | 10/2002 | Chen et al. |
| 2003/0036918 | A1 | 2/2003 | Pintsov |
| 2003/0040987 | A1* | 2/2003 | Hudson et al. ................. 705/30 |
| 2003/0115141 | A1* | 6/2003 | Felix et al. ...................... 705/40 |
| 2003/0120526 | A1 | 6/2003 | Altman et al. |
| 2003/0225600 | A1 | 12/2003 | Slivka et al. |
| 2004/0083134 | A1* | 4/2004 | Spero et al. ...................... 705/16 |
| 2004/0167808 | A1 | 8/2004 | Fredericks et al. |
| 2004/0243489 | A1* | 12/2004 | Mitchell et al. ................. 705/30 |
| 2005/0108117 | A1* | 5/2005 | Newman ......................... 705/30 |
| 2005/0222944 | A1* | 10/2005 | Dodson et al. .................. 705/39 |
| 2006/0212321 | A1 | 9/2006 | Vance et al. |
| 2008/0319808 | A1 | 12/2008 | Wofford et al. |

OTHER PUBLICATIONS

"Gelco Information", Business Wire, Mar. 17, 1998.

"American Express Announces New Features in the latest Release of AXI(SM) at Corporate Travel World", PR Newswire, Mar. 2, 1998, p0302NYM159.

File History of U.S. Appl. No. 10/373,096.

File History of U.S. Appl. No. 10/270,672.

File History of U.S. Appl. No. 12/755,127.

File History of U.S. Appl. No. 12/773,282.

File History of U.S. Appl. No. 11/763,562.

Office Action issue in Application No. 10/373,096 issued on May 20, 2008.

Office Action issued in U.S. Appl. No. 11/763,562, mailed Mar. 15, 2011.

* cited by examiner

SYSTEM AND METHOD FOR EXPENSE MANAGEMENT

This application claims priority from U.S. Provisional Application Ser. No. 60/581,766, filed Jun. 23, 2004. The entirety of that provisional application is incorporated herein by reference.

FIELD OF THE INVENTION

The present invention relates to the field of expense reporting.

BRIEF DESCRIPTION OF THE FIGURES

FIGS. 3-6 are exemplary screen shots, according to one embodiment of the present invention.

DESCRIPTION OF EMBODIMENTS OF THE INVENTION

Figure 1:
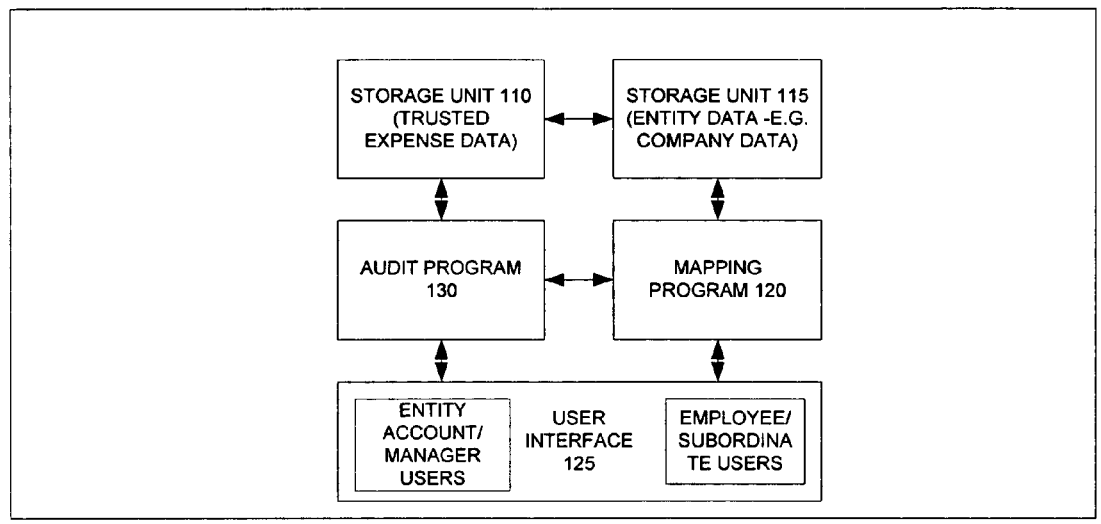
FIG. 1 illustrates the primary components of a representative operating environment, according to one embodiment of the present invention.

FIG. 1 illustrates an expense management system 100, according to one embodiment of the present invention. Expense management system 100 imports trusted itemized data and maps the data to defined expense types. The expense management system 100 comprises: storage units 110 and 115; a mapping program 120; an audit program 130; and a user interface 125.

FIG. 1 depicts storage units 110 and 115. However, these storage units are combinable in other embodiments. Storage unit 110 contains trusted itemized expense data, which is transmitted or obtained from any trusted source (e.g., credit card companies or any vendor that provides receipts in an electronic form). It should be noted that either all of the expense data or just a portion of the expense data can be itemized. Expense data can come in a form that identifies the location of the purchase, the amount of the total transaction, the amount and written description of the itemized sub-transactions, and a system-specific code which also describes or categorizes the sub-transactions. Storage unit 110 stores a master expense type list containing the complete domain of possible expense types utilized in expense management system 100. Expense types are associated with an identifier, a description, a general ledger or other accounting code, a list of data fields to be supplied on the expense report, or corporate policy information, or any combination thereof.

Company specific data to be utilized by expense management system 100 is stored in storage unit 115. Companies can select a sub-domain from the domain of the master expense type list. This sub-domain is typically derived from company needs in relation to control or accounting polices, or tax considerations. For additional mapping purposes, other codes or identifiers can be attached to the expense types in the sub-domain to facilitate various company functions. For example, an accounting code or identifier can be assigned to an expense type to allow the expense report to be imported into other company reports. Storage unit 115 also stores expense reports after and during processing by mapping program 120.

Mapping program 120 maps the trusted itemized expense data, stored in storage unit 110, to the domain of expense types selected by a company using expense management system 100. Prior to mapping expense data, the program correlates vendor expense codes to company-selected expense types. The correlation can match any number of expense codes to any number of expense types, and the program is customizable to incorporate corporate policies, desires and/or tax considerations. To perform the mapping operation, the expense codes assigned to the expense data can be read from the trusted source, or a vendor (e.g., hotel or rental car company), for each expense, itemized or not, and then the correlated expense types are assigned to each expense.

To facilitate mapping accuracy, one embodiment utilizes a filtering system that searches for key words in the trusted data (e.g., the filter searches expense descriptions in the trusted data for the key word "Internet" because some vendors use the same numerical expense code for telephone and Internet charges). The filter is customizable to cater to the weaknesses or idiosyncrasies of each trusted source or vendor, which in turn can improve overall system performance when more than one trusted source is providing expense data.

In one embodiment, the user interface 125 allows for at least two types of users. (However, in another embodiment, only one type of user can also be used in user interface 125.) First, company accountants/managers ("managers") provide expense management system 100 with company-specific information, which is then stored in storage unit 115. As discussed supra, managers can pick expense types from the master list of expense types to utilize, which when selected constitute the domain of expense types available to expense management system 100 for mapping purposes. Also, managers can assign additional data to the expense types to facilitate other company specific functions (e.g., company specific accounting codes can be assigned to the expense types to facilitate importing mapped expense data to other company systems). Managers also interact with expense management unit system 100 through auditing program 130.

Second, employees or travelers (e.g., those receiving the goods listed in the itemized expense data) primarily interface with expense management system 100 by editing and approving the mapped expense data, which is used to generate the final approved expense report. Additionally, expense management system 100 is customizable to allow employees to manually change the expense type assigned to imported expense data, or to allow employees to manually enter in expense data that was not or could not be imported by expense management system 100 though the trusted source.

In one embodiment, an audit program 130 allows managers to control and approve corrections made by employees to the mapped expense data. When an employee makes a change to the mapped expense data (e.g., by assigning the itemized expense data to a different expense types or correcting a line item amount), the change is flagged for auditing. This flagging process can happen in a number of ways with similar results. In one embodiment, to identify the changed mapping or transaction amounts, expense management system 100 will save a copy of the original mapped expense data and compare it with user-changed data. Thus, changes made outside the automated mapping process provided by expense management system 100 are scrutinized ensuring greater accuracy and preventing fraud. Auditing program 130 is customizable (e.g., programmed with tolerances or filters) to enable the system to only flag changes that meet (or do not meet) selected criterion (e.g., changes that are greater than a certain percentage or that map expense line items to the "personal" expense type will automatically be approved).

Figure 2:
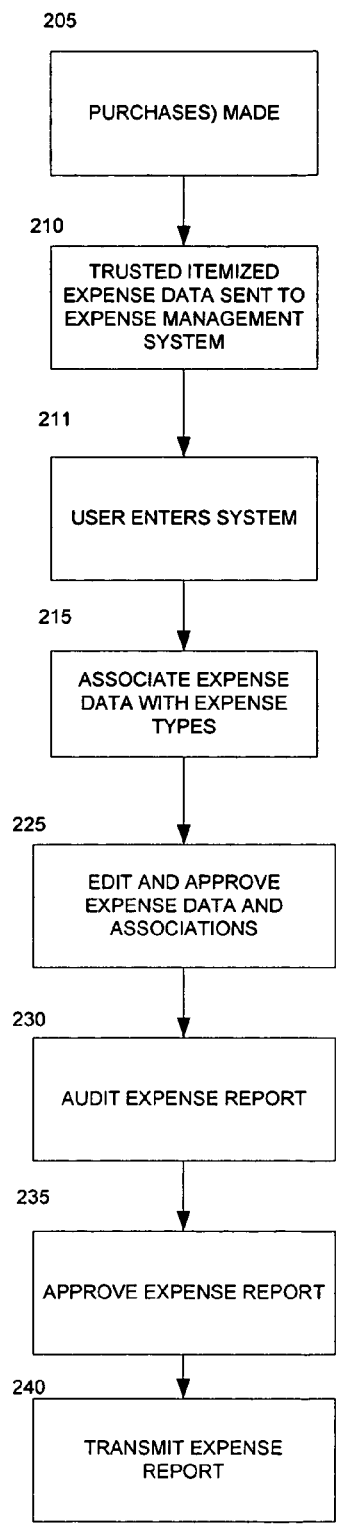
FIG. 2 illustrates a method of expense management, according to one embodiment of the present invention.

FIG. 2 illustrates a method of expense management, according to one embodiment of the present invention. FIG. 2 is explained in the context of purchases made with a hotel or car rental company. These examples in no way limit the applicability of the novel systems and methods disclosed herein.

In step 205, purchase(s) are made by an individual or entity (e.g., employee, traveler), who will eventually be responsible to submit an expense report accounting for the purchase(s). Although any individual or entity can be used in the example embodiment of FIG. 2, an employee will be used for demonstration purposes. Those skilled in the art will recognize that any individual or entity can use the present invention.

In one embodiment, the employee charges various expenses to a company credit card. In a hotel example, an employee purchases lodging, personal telephone calls, business telephone calls, mini-bar items, room service, meals at the hotel restaurant, Internet use, valet service, etc. The hotel purchases are made with a company assigned credit card, which is issued by a credit card company that has an agreement with the hotel to provide trusted itemized expense data.

Those skilled in the art will recognize that there are other methods of payment that could be used. The credit card vendors (e.g., MasterCard, Visa, American Express, Diners, etc.) provide data feeds to their customers containing information about all transactions involving the credit cards issued to the employees at their company. Those skilled in the art will recognize that there are other sources for data feeds, including the merchants themselves. The data feeds are typically electronic text files. The degree of detail contained may vary by data feed, as the credit card vendors typically have different data feed products and products with more detail may cost more to obtain. Within a given electronic text file, the level of detail may vary from transaction to transaction as not all merchants provide the same level of detail to the credit card vendors about purchases made by travelers. In one embodiment, certain data feed products would include hotel portfolio data (i.e., line-item detail breaking down the individual expenses on hotel receipts), referred to as sub-transactions, from hotel merchants who choose to participate in the providing such detail. It should be noted that expense management system 100 is still operative if only some, or even none, of the expense data is broken into sub-transactions. Those skilled in the art will understand that the exact format of the electronic text files may vary and that there are many other possible methods of transmission.

In step 210, the trusted itemized expense data is sent to expense management system 100. In one embodiment, the expense management system 10 imports electronic text with transaction data and analyzes it to identify the employees who charged each of the transactions. Thus, after the employee's trip is over, the employer receives an electronic data stream of the expense data (some of which has been broken into sub-transactions), which is then fed into expense management system 100.

Figure 3:
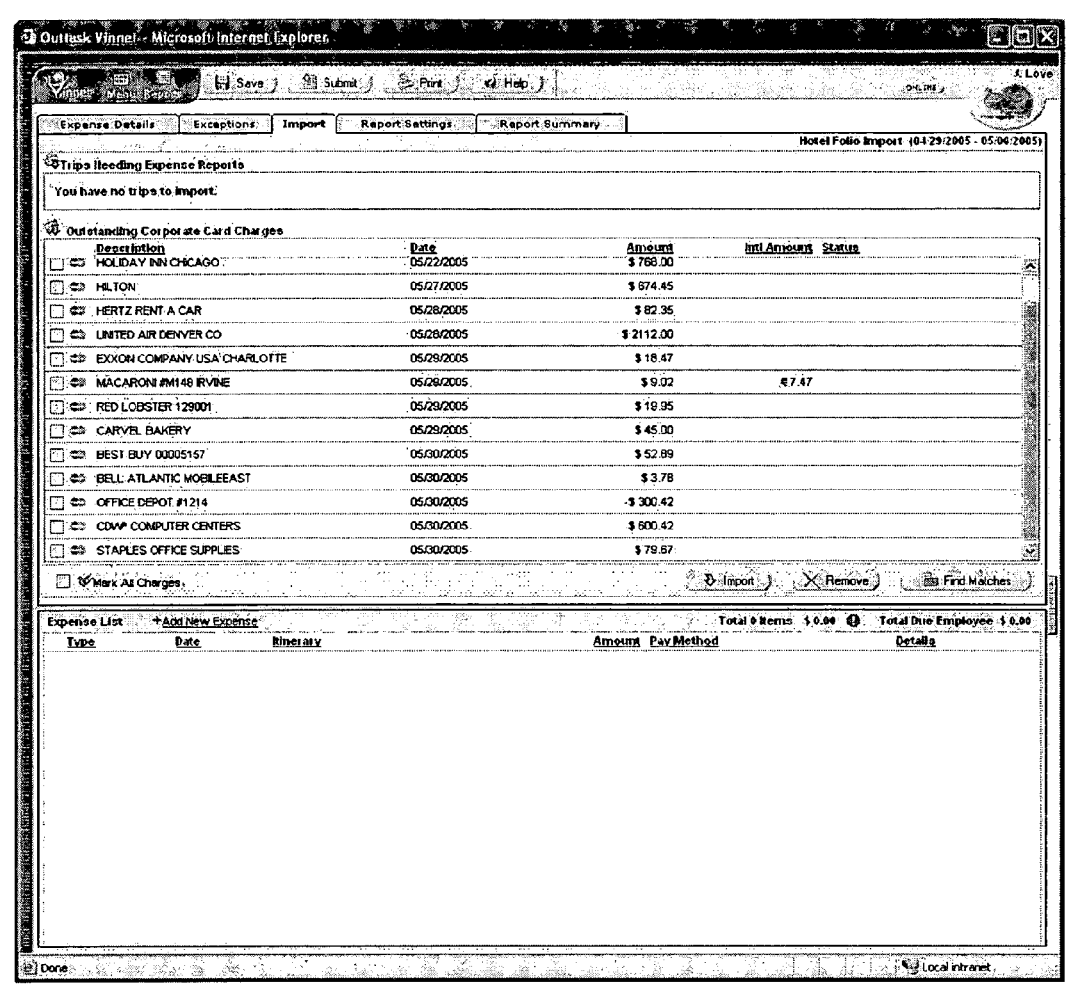
Figure 4:
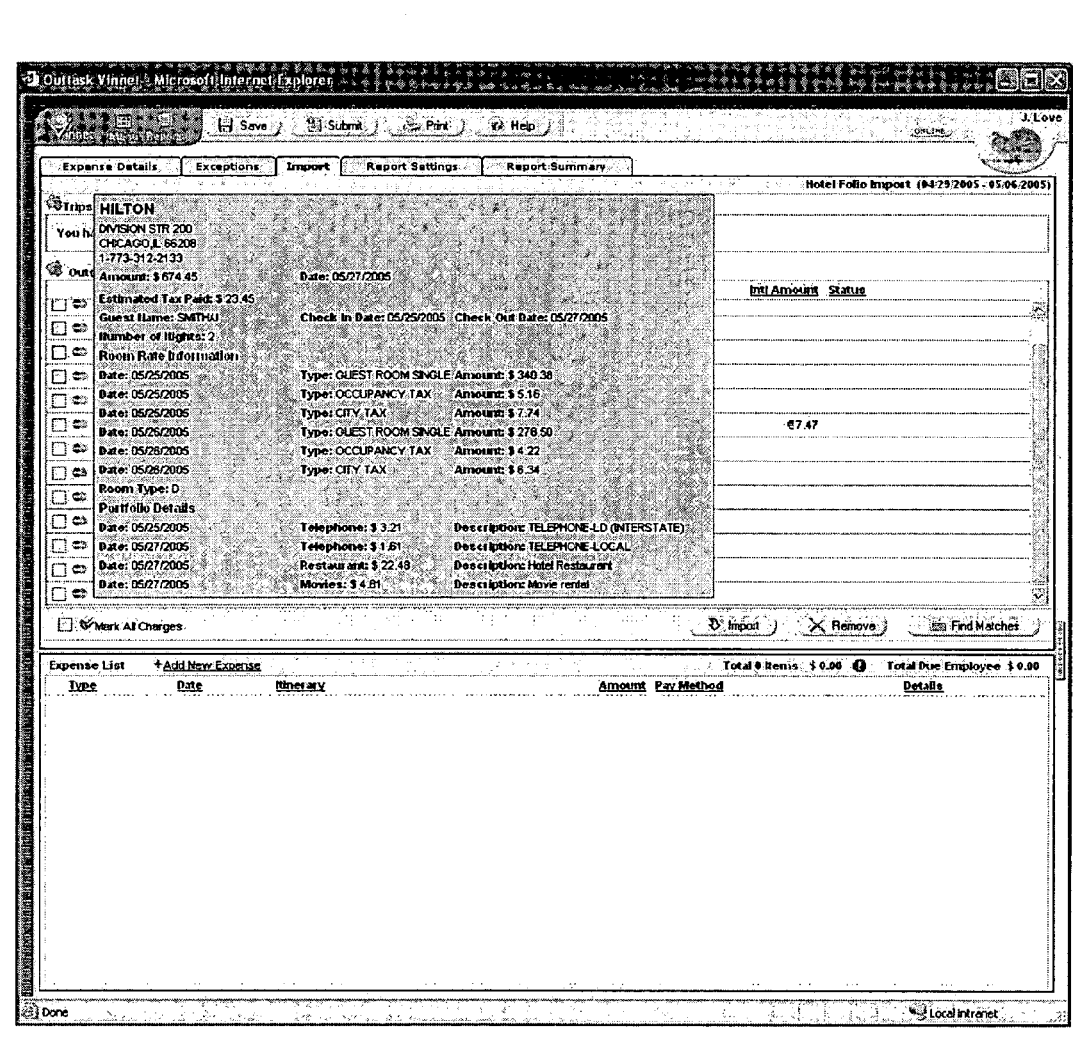

In step 211, at some point in the process, the employee gains access to the system and sees a list of corporate card charges ready to be imported. For example, the employee could see a list of charges on his corporate credit card, some of which are from hotels that have an agreement to provide sub-transaction data to the company through the corporate credit card. FIG. 3 is an example screen shot illustrating credit card data, according to one embodiment of the invention. The user can review sub-transaction data from hotels or other sources that have agreed to provide such data. In one embodiment, the user can place his mouse icon over such charges in order to see the sub-transactions (line items). In the hotel example, these sub-transactions should match the receipt that the user received upon check-out from the hotel. FIG. 4 illustrates an example of such sub-transaction data, according to one embodiment of the invention.

It should be noted that, in one embodiment, step 211 is optional, and the expense report may be automatically generated. For example, expense reports could be automatically generated on a periodic basis from corporate card data because a certain entity had many employees without Internet access.

It should also be noted that expense reports serve multiple purposes including, but not limited to, allowing the employee to be reimbursed for approved out-of-pocket expenses incurred during business travel. Expense management tools often include the capability of automatically paying credit card bills for company-issued credit cards. Employees are also often liable for expenses charged to these company-issued credit cards that are not approved by the employer or not authorized by company procedure. Thus, employees often include expenses from company-issued credit cards in their expense reports to obtain the required approval and to automate payment.

Figure 6:
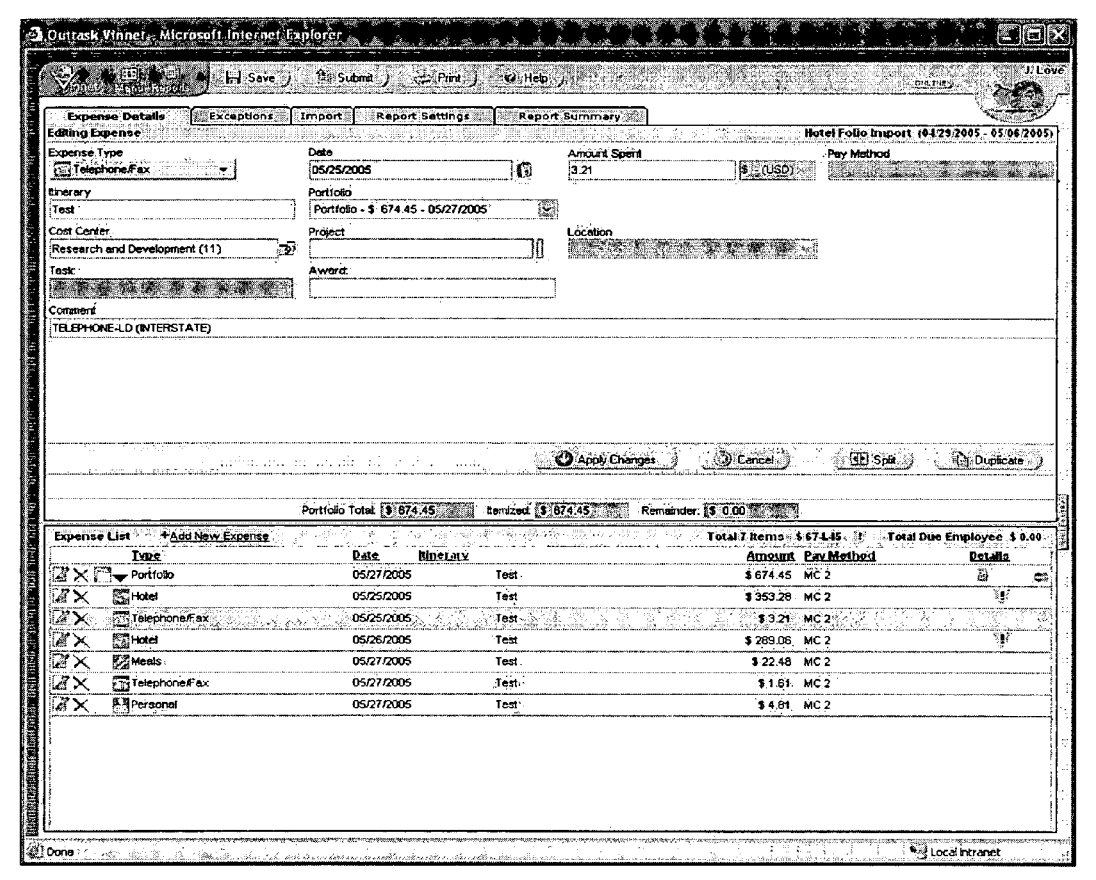

In step 215, expense management system 100 reads the expense codes in the expense data and maps all possible line items to their appropriate expense types. In step 211, the employee has imported charges that need to be reimbursed for a particular expense report. As shown in FIG. 6, in importing charges with sub-transaction data, such as a hotel charge, the charge comes into the expense report already broken down. With a hotel example, the hotel room comes in designated as a hotel expense, the two phone calls come in designated as telephone/fax, the restaurant comes in designated as a meal, and the movie (which is not reimbursable under company policy), comes in designated as personal. This procedure has saved time for the employee and increased accuracy, as people often either mis-key their receipt entry, or choose not to include certain itemizations because it is too time-consuming. These decisions can be detrimental to a company. For example, a company may not be able to fully take deductions for certain items (e.g., meals) that are taxed as a beneficial rate.

Note that in setting up expense management system 100, the company has selected expense types to utilize (e.g., based on internal controls and policies, tax requirements). For example, the line item for the lodging expense is assigned the expense code "395," which correlates to the expense type "travel-lodging," which is one of the expense types the company using expense management system 100 selected from the master expense type list.

In the rental car example, the rental car company charges the employee for the daily rental car rate, insurance, over mileage fee, refueling, etc. Instead of using a credit card to record and transmit the expense data 210, as illustrated in the hotel example, the rental car company has an arrangement with the employer (or a service that manages expenses for the employer) to send expense data directly to them in the form of trusted receipts. Is should be noted that almost all vendors, not just rental car companies or hotels, have the potential to provide electronic trusted receipts. Although the data from these receipts are different from that of the trusted expense data feeds from the credit card companies, expense management system 100 can still process this trusted receipts in a similar way—mapping the itemized expenses to appropriate expense types.

In one embodiment, expense management system 100 maintains a master list of expense types. Company accountants or managers choose from this list of expense types when creating a domain of expense types that will be used by the company or a department in the company. Those skilled in the art will recognize that an expense management system could contain multiple master lists of expense types, and that different groups of users within a company could use different lists. When expense items are imported the expense management system chooses the expense type based on semantic information added to each expense type on the master list. This semantic type information could be an integer code.

In one embodiment, semantic information can be added to all expense types. In other embodiments, semantic information can be added to only a subset of expense types, or no expense types at all. The user can determine which embodiment best fits the user's needs. For example, if the user has an expense in their system for "equipment repair", this is not an expense type that is returned by any of the hotel providers, so it would never get a hotel semantic term. However, if the trusted source, such as a rental car provider, does have the expense type "equipment repair", then this expense would get a rental car provider semantic term.

Those skilled in the art will recognize that there are many methods for storing semantic information. The semantic information provides a mapping between the possible list of types for the sub-transactions and the expense types in the expense management system. For example, the semantic information could indicate which expense type is to be used when importing a telephone charge, or an in-room movie. When a sub-transaction is imported, the type information from that sub-transaction is cross-referenced with the list of expense types to try to find an expense type with semantic information indicating that it is the correct type to use for this type of sub-transaction. If a match is found then the line item is imported with this type. For example, an Internet charge could be designated by the hotel as a phone charge expense type. However, a semantic search of the sub-transaction would reveal the word Internet to show that the Internet charge was for the Internet and not the phone.

Figure 5:
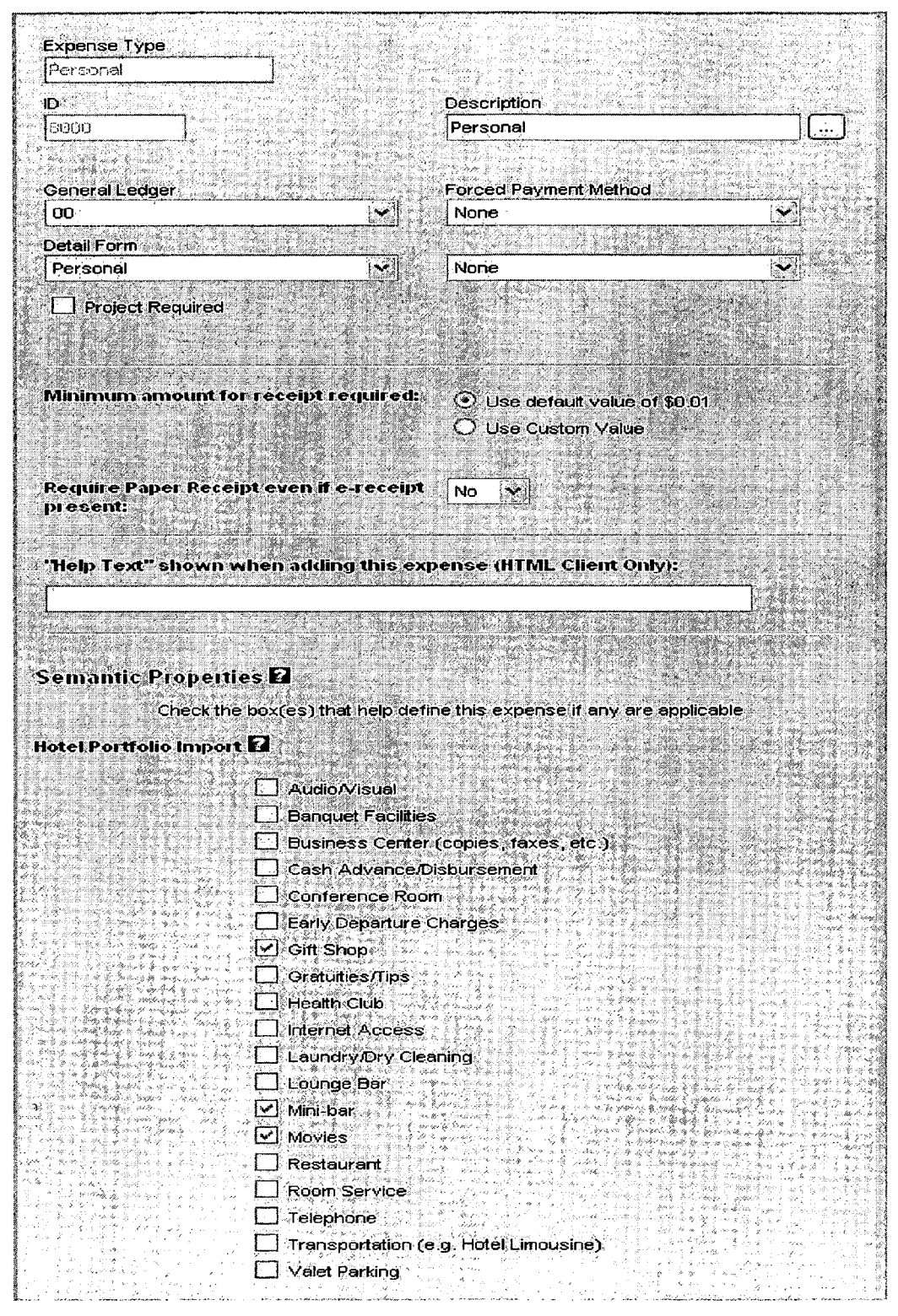

FIG. 5 is an exemplary screen shot illustrating how expense types are associated with semantics, according to one embodiment of the invention. The expense type is "personal". The semantics associated with personal expenses include gift shop, mini-bar, and movies, according to this particular company's policies.

In a further embodiment, the expense management system maintains a master list of accounting codes, including but not necessarily limited to cost centers, general ledger codes, and project codes. End users may choose from this list of accounting codes when creating expenses. The system may be configured to restrict the codes that a given user may use. Those skilled in the art will recognize that perhaps no codes are used for a given expense, but on other expenses multiple codes may be necessary. When an expense transaction is imported and the expense management system detects that this transaction has been assigned to multiple accounting codes, the accounting code information stored on the sub-transactions can be read and then used to choose the values for the corresponding expense items on the expense report. The billing codes include, but are not limited to, cost centers (e.g., marketing department), a project (e.g., a particular matter), and an identifier that maps to a classification used in a company's accounting system (e.g., an air ticket may be designated differently from lodging for tax purposes).

In step 225, the employee is able to edit and approve the expense data and mapping. If an expense is mapped to more than one expense type, then the employee can select the appropriate type from the available options. If no expense type or the wrong type is assigned, then the employee can change the assigned expense type. For example, when the employee reviews the mapped hotel expense data, he or she realizes that the personal telephone calls have been included with the business telephone expense and mapped to the "travel-phone" expense type. To correct the error, the employee is able to edit this expense and parse the business from the personal calls and, in addition, the employee maps the personal telephone calls to the "personal" expense type. When the employee has reviewed all the expenses and assigned expense types where needed, the employee can approve, or sign off on, the mapped data.

In step 230, expense management system 100 is optionally able to audit the expense report. Expense management system 100 contains an audit module that can automatically compare the original transactions and sub-transactions from the data feed with the expenses actually submitted to detect differences between the two. For example, if a hotel receipt contained $100 for a room, $50 for meals and $10 for an in-room movie, but the expense report contains $100 for the room and $60 for meals, the audit module would detect this. Those skilled in the art will recognize that there are many ways to implement such an audit module including, but not limited to, a database query that compares relational database entries containing the expense reports and the original transactions and sub-transactions. Those skilled in the art will recognize that there are many ways to present the information regarding the expense reports which deviate from the data feed, such as in tabular format on-screen or in a spreadsheet file which can be read by an application such as Microsoft Excel.

In one embodiment, the audit module can be configured to have tolerances or filters, which can automatically approve a difference between the expense report and the imported data because the difference meets the programmed criteria. A zero-tolerance program would present all reports that differ by any amount, whereas a 1 percent tolerance would present reports where the difference is greater than 1 percent. Those skilled in the art will recognize that tolerances or filters can be presented in forms other than percentages.

When an employee changes an expense amount or mapping, expense management system 100 flags this change for auditing. This flagging can be performed in several ways, as one skilled in the art will recognize. One embodiment, for example, saves the original imported trusted expense data and compares this with the data approved by the employee submitting the expense report and expense management system 100 notes, or flags, all discrepancies. Additionally, according to company controls, certain expense types or charges can be flagged for auditing, even if a change has not been made to the line item (e.g., if company policies forbid reimbursement for mini-bar or valet charges, then every time these expenses appear, they can be flagged for auditing). Expense management system 100 can perform the auditing function either manually or automatically through a programmed filter or tolerance, or through a combination or both. For example, expense management system 100 can be programmed to automatically approve all changes that are mapped to the "personal" expense type.

In step 235, after the report has been sufficiently audited (if this feature is used), then it becomes an approved expense report. In step 240, the approved expense report is used in myriad accounting and company functions.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments. In particular, it should be noted that, for example purposes, the above explanation has focused on the example of a hotel charge. However, those experienced in the art will realize that any charge with sub-transactions (e.g., a rental car charge) can be used.

In addition, it should be understood that the figures and screen shots, which highlight the functionality and advantages of the present invention, are presented for example purposes only. The architecture of the present invention is sufficiently flexible and configurable, such that it may be utilized in ways other than that shown in the accompanying figures. For example, the steps in the flowchart can be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A computerized method for expense management of at least one transportation and/or lodging expense, comprising:
   automatically retrieving, by at least one computer via at least one network, at least one electronic feed of charges for multiple expense receipt records directly from at least one lodging and/or transportation vendor, the at least one feed of charges including computer-readable electronic transaction data;
   automatically detecting, by the at least one computer, that at least one expense receipt record from the multiple expense receipt records from the at least one feed of charges is comprised of two or more line items;
   automatically mapping, by the at least one computer, the two or more line items to at least one transportation and/or lodging good and/or service that is chargeable to at least one account identifier, the mapping utilizing vendor expense codes and/or keyword searches, and the mapping stored in at least one database, wherein the at least one account identifier comprises:
   at least one department identifier;
   at least one project identifier;
   at least one expense type; or
   any combination thereof;
   automatically retrieving, by the at least one computer, the mapping from the database; and
   automatically pre-populating by the at least one computer, the at least one transportation and/or lodging good and/or service mapped to each of the two or more line items from the at least one expense receipt record in at least one expense report in at least one expense management system as two or more expense itemizations;
   wherein the expense receipt record is added to the at least one expense report as at least one expense item which is marked as being comprised of the two or more expense itemizations corresponding to the two or more line items;
   wherein each expense itemization added from the at least one expense receipt record to the at least one expense report corresponds to exactly one of the two or more line items.

2. The method of claim 1, wherein the at least one expense report shows the at least two line items associated with expense types.

3. The method of claim 1, further comprising:
   providing the at least one expense report for approval;
   providing the at least one expense report for reimbursement; or
   providing the at least one expense report so that it can be integrated with other documents; or
   any combination thereof.

4. The method of claim 1, further comprising searching the at least one expense receipt record for pre-defined criteria.

5. The method of claim 1, further comprising:
   associating at least one company accounting code to at least one expense type.

6. The method of claim 5, wherein the at least one expense type comprises program-recognizable information.

7. The method of claim 1, further comprising:
   allowing at least one user to edit the at least one expense report; or
   allowing at least one user to approve the at least one expense report;
   or any combination thereof.

8. The method of claim 7, further comprising:
   flagging where the at least one user edits the at least one expense report; and
   allowing the at least one user to attach at least one explanation to each edit of the at least one expense report.

9. The method of claim 8, wherein at least one second user audits at least one flagged edit to the at least one expense report.

10. The method of claim 1, wherein each expense itemization is assigned to at least one expense type associated with at least one attribute comprising:
    at least one identifier;
    at least one description;
    at least one general ledger or other accounting code;
    at least one list of data fields to be supplied on the at least one expense report; or
    corporate policy information; or
    or any combination thereof.

11. The method of claim 10, wherein the at least one expense type is additionally comprised of semantic information describing at least one type of expense.

12. The method of claim 11, wherein the semantic information comprises at least one identifier of the at least one expense type.

13. The method of claim 1, wherein the line items contain information identifying at least one expense, where possible expense identifications are determined by at least one vendor producing the at least one expense data record.

14. The method of claim 13, further comprising associating at least one expense identification determined by the at least one vendor producing the at least one expense data record to at least one master expense identification on at least one master expense type list.

15. The method of claim 14, wherein at least one expense itemization is automatically assigned to at least one expense type based on associating the at least one expense type determined by the at least one vendor producing the at least one expense data record to the at least one master expense type on the at least one master expense type list.

16. The method of claim 1, further comprising auditing the at least one expense report by comparing the two or more line items with the two or more expense itemizations on the at least one expense report.

17. The method of claim 16, further comprising:
allowing at least one user to edit the at least one expense report; and
auditing the at least one expense report by comparing edits of the at least one user to the at least one expense data record from the at least one lodging and/or transportation vendor.

18. The method of claim 1, wherein the at least one lodging and/or transportation vendor comprises:
at least one hotel entity;
at least one car rental entity; or both.

19. The method of claim 1, wherein the method is customizable to incorporate policies, desires, and/or tax considerations for at least one entity using the method to assist in creating expense reports for its employees.

20. The method of claim 1, wherein the at least one transportation and/or lodging good and/or service comprises: at least one lodging room rental, at least one tax, internet access, at least one telephone call, food and/or beverage from at least one eating establishment, at least one item from at least one mini-bar, at least one service from at least one business center, room service, gym or health club access, an item from at least one hotel store, banquet facility rental at least one gratuity, laundry service, parking, limousine service, at least one movie, audio and/or video equipment rental, at least one cash advance, at least one conference room rental, or at least one early departure fee, or any combination thereof.

21. The method of claim 1, wherein the at least one transportation and/or lodging good and/or service comprises: at least one automobile rental, insurance, fuel, extra mileage, or equipment repair, or any combination thereof.

22. The method of claim 1, wherein the at least one computer also receives at least one additional electronic feed of charges containing multiple expense receipt records for lodging and/or transportation expense from at least one credit card vendor.

23. The method of claim 22, wherein: the at least one computer automatically detects that at least one transaction appears only in the at least one electronic feed of charges received from the at least one credit card vendor; the at least one transaction is comprised of two or more line items; the at least one computer automatically maps the two or more line items to at least one transportation and/or lodging good and/or service that is chargeable to at least one account identifier, the mapping utilizing vendor expense codes and/or keyword, and the mapping stored in at least one database; the at least one computer automatically retrieves the mapping from the at least one database; the at least one computer automatically pre-populates the at least one transportation and/or lodging good and/or service mapped to each of the two or more line items from the at least one expense receipt record on at least one expense report in at least one expense management system as two or more expense itemizations; the expense receipt record is added to the at least one expense report as at least one expense item which is marked as being comprised of the two or more expense itemizations corresponding to the two or more line items; and each expense itemization added from the at least one expense receipt record to the at least one expense report corresponds to exactly one of the two or more line items.

24. A computerized system for expense management of at least one transportation and/or lodging expense, comprising:
at least one server and/or at least one client coupled to at least one network; and
at least one application coupled to the at least one server and/or the at least one client, the at least one application configured for:
automatically retrieving, by at least one computer via at least one network, at least one electronic feed of charges for multiple expense receipt records directly from at least one lodging and/or transportation vendor, the at least one feed of charges including computer-readable electronic transaction data;
automatically detecting, by the at least one computer, that at least one expense receipt record from the multiple expense receipt records from the at least one feed of charges is comprised of two or more line items;
automatically mapping, by the at least one computer, the two or more line items to at least one transportation and/or lodging good and/or service that is chargeable to at least one account identifier, the mapping utilizing vendor expense codes and/or keyword searches, and the mapping stored in at least one database, wherein the at least one account identifier comprises:
at least one department identifier;
at least one project identifier;
at least one expense type; or
any combination thereof;
automatically retrieving, by the at least one computer, the mapping from the database; and
automatically pre-populating by the at least one computer, the at least one transportation and/or lodging good and/or service mapped to each of the two or more line items from the at least one expense receipt record in at least one expense report in at least one expense management system as two or more expense itemizations;
wherein the expense receipt record is added to the at least one expense report as at least one expense item which is marked as being comprised of the two or more expense itemizations corresponding to the two or more line items;
wherein each expense itemization added from the at least one expense receipt record to the at least one expense report corresponds to exactly one of the two or more line items.

25. The system of claim 24, wherein the at least one expense report shows the at least two line items associated with expense types.

26. The system of claim 24, wherein the at least one application further comprises:
providing the at least one expense report for approval;
providing the at least one expense report for reimbursement; or
providing the at least one expense report so that it can be integrated with other documents; or
any combination thereof.

27. The system of claim 24, wherein the at least one application further comprises searching the at least one expense receipt record for pre-defined criteria.

28. The system of claim 24, wherein the at least one application further comprises associating at least one company accounting code to at least one expense type.

29. The system of claim 28, wherein the at least one expense type comprises program-recognizable information.

30. The system of claim 24, wherein the at least one application further comprises:
allowing at least one user to edit the at least one expense report; or
allowing at least one user to approve the at least one expense report;
or any combination thereof.

31. The system of claim 30, wherein the at least one application further comprises:
flagging where the at least one user edits the at least one expense report; and
allowing the at least one user to attach at least one explanation to each edit of the at least one expense report.

32. The system of claim 31, wherein at least one second user audits at least one flagged edit to the at least one expense report.

33. The system of claim 24, wherein each expense itemization is assigned to at least one expense type associated with at least one attribute comprising:
at least one identifier;
at least one description;
at least one general ledger or other accounting code;
at least one list of data fields to be supplied on the at least one expense report; or
corporate policy information; or
any combination thereof.

34. The system of claim 33, wherein the at least one expense type is additionally comprised of semantic information describing at least one type of expense.

35. The system of claim 34, wherein the semantic information comprises at least one identifier of the at least one expense type.

36. The system of claim 24, wherein the line items contain information identifying at least one expense, where possible expense identifications are determined by at least one vendor producing the at least one expense data record.

37. The system of claim 36, wherein the at least one application further comprises associating at least one expense identification determined by the at least one vendor producing the at least one expense data record to at least one master expense identification on at least one master expense type list.

38. The system of claim 37, wherein at least one expense itemization is automatically assigned to at least one expense type based on associating the at least one expense type determined by the at least one vendor producing the at least one expense data record to the at least one master expense types on the at least one master expense type list.

39. The system of claim 24, wherein the at least one application further comprises auditing the at least one expense report by comparing the two or more line items with the two or more expense itemizations on the at least one expense report.

40. The system of claim 39, wherein the at least one application further comprises:
allowing at least one user to edit the at least one expense report; and
auditing the at least one expense report by comparing edits of the at least one user to the at least one expense data record from at least one trusted source.

41. The system of claim 24, wherein the at least one lodging and/or transportation vendor comprises:
at least one hotel entity;
at least one car rental entity; or
both.

42. The system of claim 24, wherein the at least one application is customizable to incorporate policies, desires, and/or tax considerations for at least one entity using the system to assist in creating expense reports for its employees.

43. The system of claim 24, wherein the at least one transportation and/or lodging good and/or service is one of: at least one lodging room rental, at least one tax, internet access, at least one telephone call, food and/or beverage from at least one eating establishment, at least one item from at least one mini-bar, at least one service from at least one business center, room service, gym or health club access, an item from at least one hotel store, banquet facility rental at least one gratuity, laundry service, parking, limousine service, at least one movie, audio and/or video equipment rental, at least one cash advance, at least one conference room rental, or at least one early departure fee, or any combination thereof.

44. The system of claim 24, wherein the at least one transportation and/or lodging good and/or service comprises: at least one automobile rental, insurance, fuel, extra mileage, or equipment repair, or any combination thereof.

45. The system of claim 24, wherein the at least one computer also receives at least one electronic feed of charges containing multiple expense receipt records for lodging and/or transportation expenses from at least one credit card vendor.

46. The system of claim 45, wherein: the at least one computer automatically detects that at least one transaction appears only in the at least one electronic feed of charges received from the at least one credit card vendor; the at least one transaction is comprised of two or more line items; the at least one computer automatically maps the two or more line items to at least one transportation and/or lodging good and/or service that is chargeable to at least one account identifier, the mapping utilizing vendor expense codes and/or keyword, and the mapping stored in at least one database; the at least one computer automatically retrieves the mapping from the at least one database; the at least one computer automatically pre-populates the at least one transportation and/or lodging good and/or service mapped to each of the two or more line items from the at least one expense receipt record on at least one expense report in at least one expense management system as two or more expense itemizations; the expense receipt record is added to the at least one expense report as at least one expense item which is marked as being comprised of the two or more expense itemizations corresponding to the two or more line items; and each expense itemization added from the at least one expense receipt record to the at least one expense report corresponds to exactly one of the two or more line items.

* * * * *